(12) United States Patent  (10) Patent No.: US 8,491,205 B2
Barreiro  (45) Date of Patent: Jul. 23, 2013

(54) CAMERA STABILIZING DEVICE

(71) Applicant: John Barreiro, San Miguel de Allende (MX)

(72) Inventor: John Barreiro, San Miguel de Allende (MX)

( * ) Notice: Subject to any disclaimer, the term of this patent is extended or adjusted under 35 U.S.C. 154(b) by 0 days.

(21) Appl. No.: 13/655,922

(22) Filed: Oct. 19, 2012

(65) Prior Publication Data

US 2013/0101277 A1   Apr. 25, 2013

Related U.S. Application Data

(60) Provisional application No. 61/549,827, filed on Oct. 21, 2011.

(51) Int. Cl.
*G03B 17/00* (2006.01)
*G03B 11/00* (2006.01)
*H04N 5/225* (2006.01)
*A47B 97/00* (2006.01)

(52) U.S. Cl.
USPC ........... 396/421; 396/423; 396/544; 348/373; 248/500

(58) Field of Classification Search
USPC .. 396/423, 421, 422, 424, 428, 544; 348/373, 348/376; 248/500
See application file for complete search history.

(56) References Cited

U.S. PATENT DOCUMENTS

| 1,766,090 | A | 6/1930 | Worsching |
| 3,317,169 | A | 5/1967 | Hendricks |
| 3,447,422 | A | 6/1969 | Miklos |
| 3,575,369 | A | 4/1971 | Tetlow |
| 4,155,636 | A | 5/1979 | Reeberg |
| 4,266,867 | A | 5/1981 | Reeberg |
| 4,328,917 | A | 5/1982 | Reeberg |
| 4,714,184 | A | 12/1987 | Young et al. |
| 5,738,328 | A | 4/1998 | O'Farrill |
| 6,752,369 | B1 | 6/2004 | Cameron |
| 7,097,368 | B2 | 8/2006 | Gonzales |

*Primary Examiner* — Rochelle-Ann J Blackman
(74) *Attorney, Agent, or Firm* — Michael Coblenz

(57) ABSTRACT

A camera stabilizing device is disclosed. The device consists of an essentially triangular stabilization platform to which the camera is attached, an inverted tripod created by straps attached to the three ends of the stabilization platform and connected to a connecting plate locate below the stabilization platform, a connecting lanyard connected to the connecting plate on one end and to a foot strap on the other end which the photographer can wear on a foot and in a shoe. When the photographer attaches the camera to the platform and lifts it to take a photograph, the lanyard creates tension on the straps, which minimizes movement and stabilizes the camera. The camera can be attached to the stabilization platform by means of a standard thumb screw, or by means of a mounting plate that can be mounted on the platform in either the horizontal or vertical camera orientation.

14 Claims, 11 Drawing Sheets

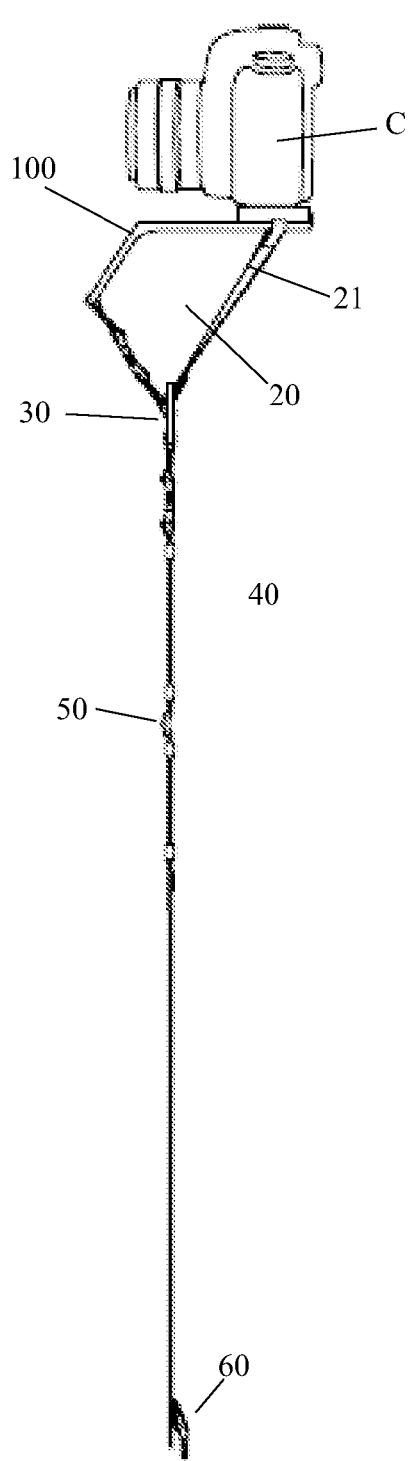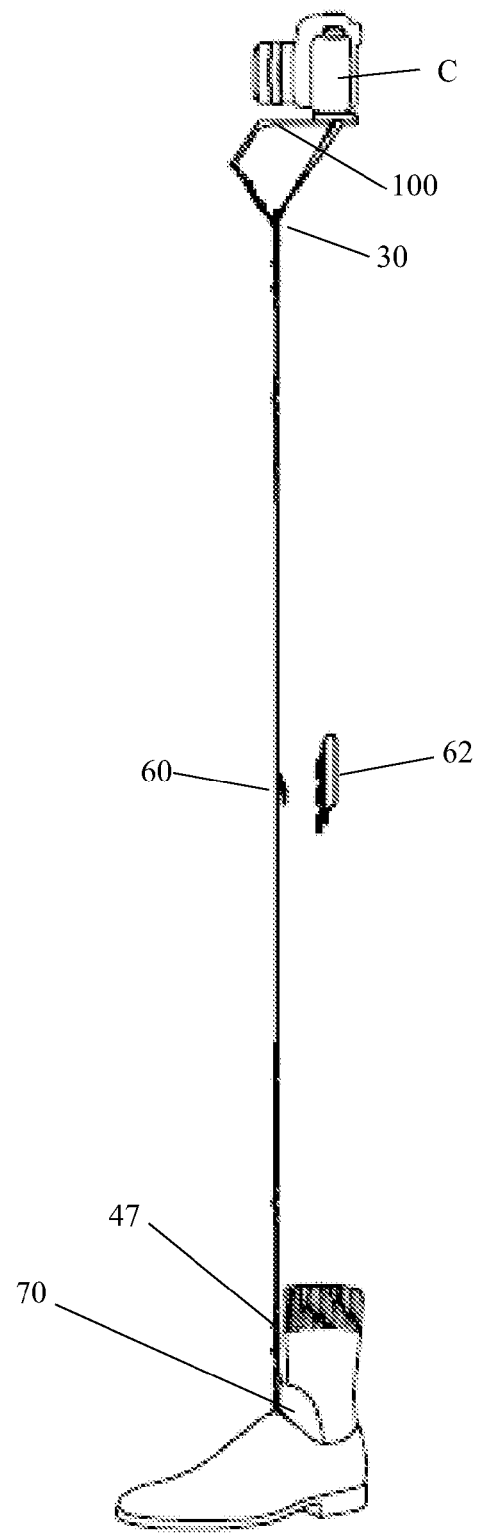
FIG 1
FIG 2

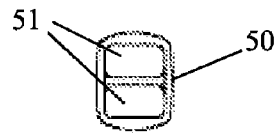
FIG 16
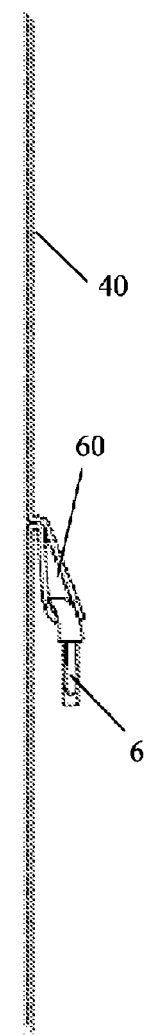
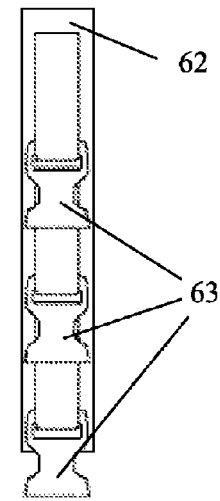
FIG 18
FIG 17
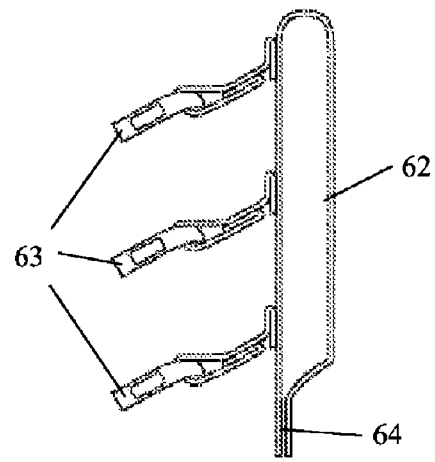
FIG 19

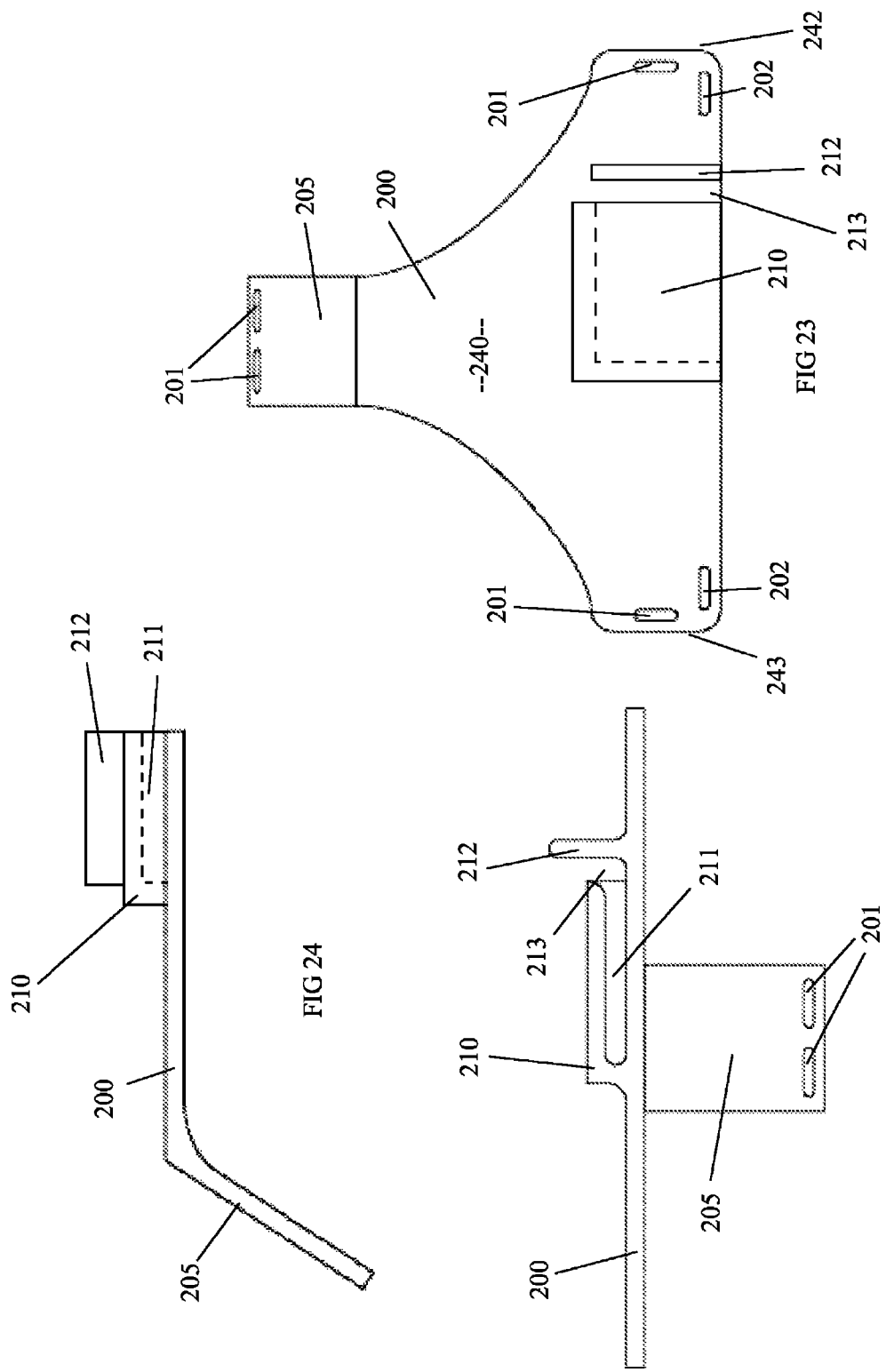

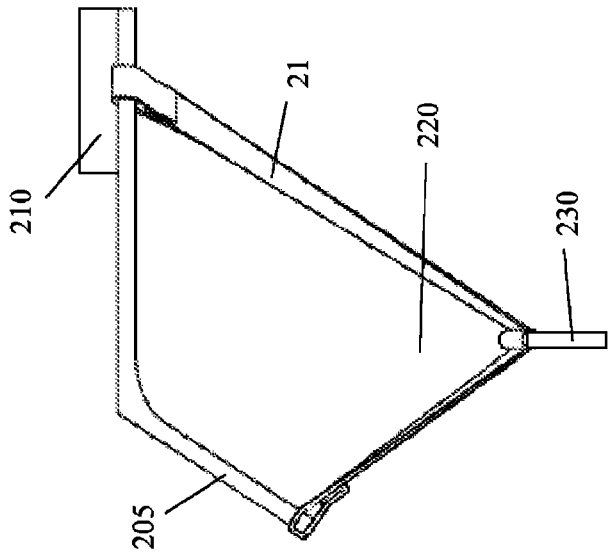
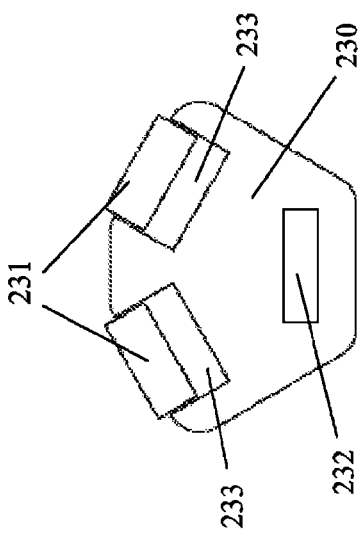
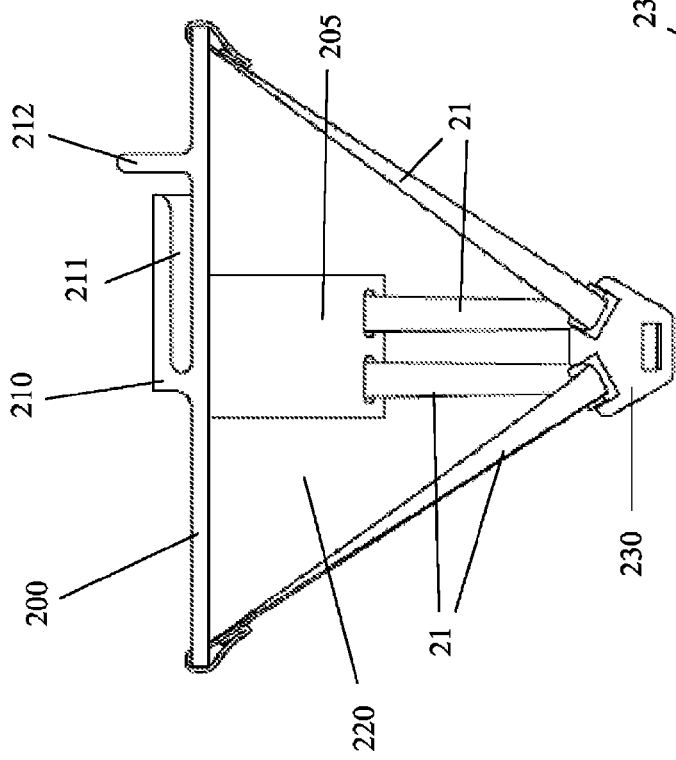

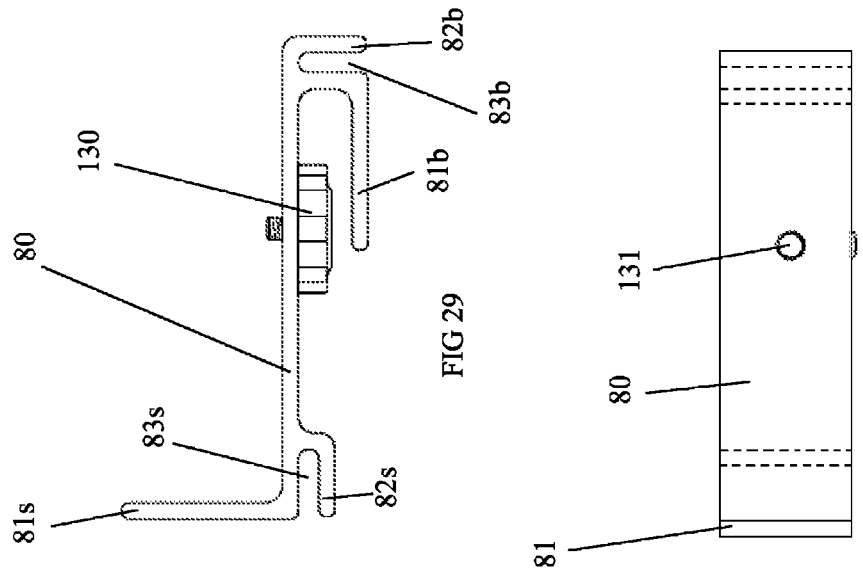
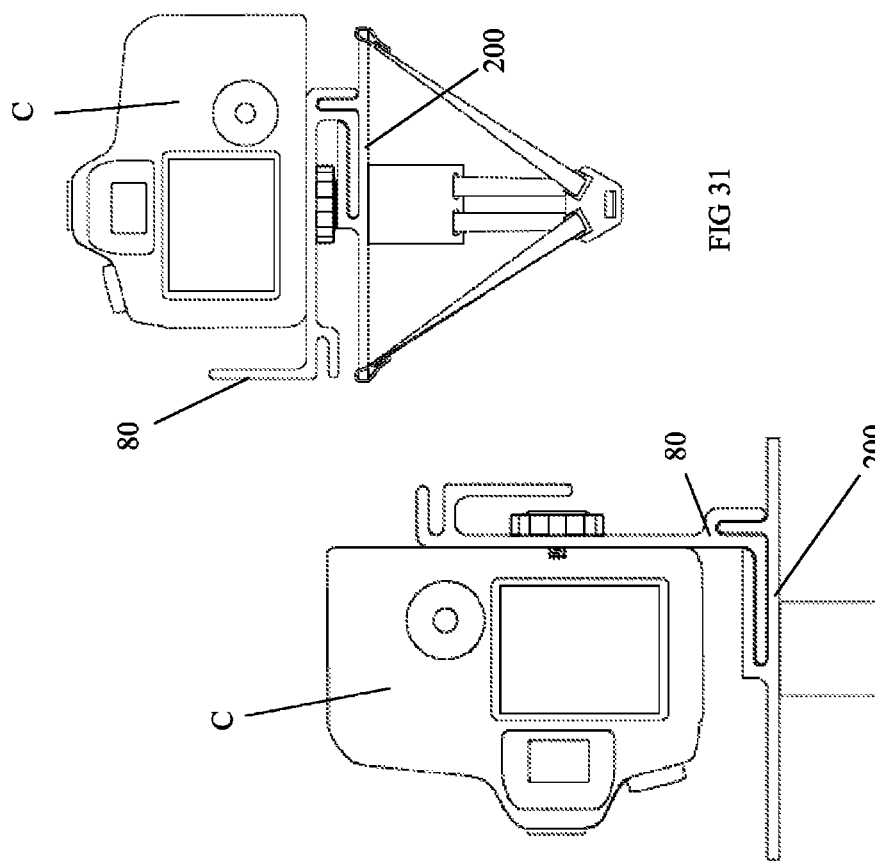

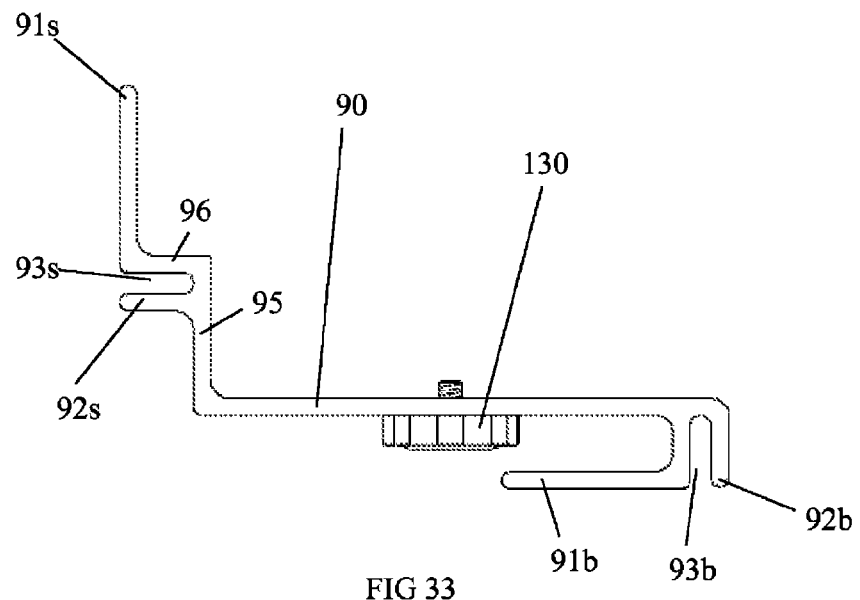
FIG 33
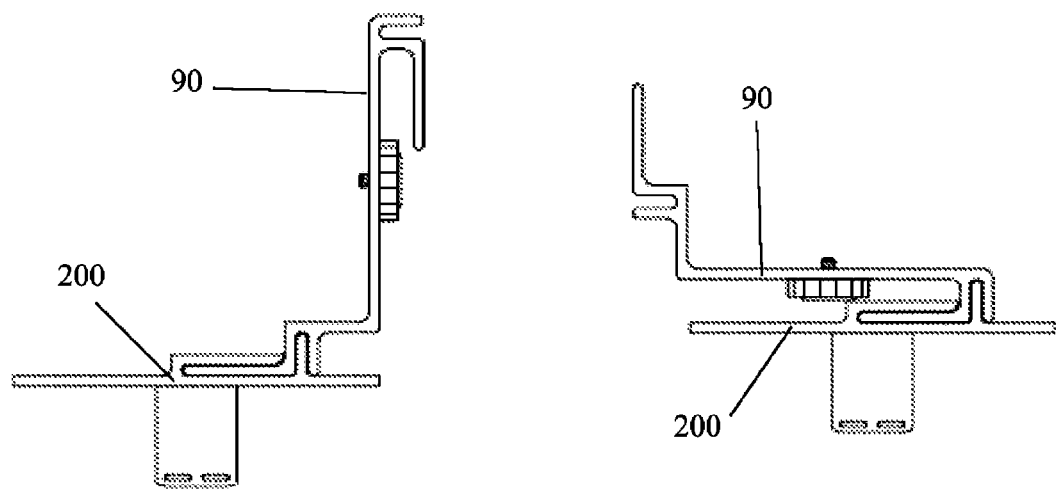
FIG 35
FIG 34

CAMERA STABILIZING DEVICE

CROSS REFERENCE TO RELATED APPLICATIONS

This application is a continuation of U.S. application 61/549,827, filed on Oct. 21, 2011, and incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a device for stabilizing a camera to take pictures, and more particularly discloses a stabilization platform that is stabilized by stabilizing straps which create an inverted tripod that is attached to a lanyard that connects to the foot of the photographer to stabilize the camera.

2. Description of the Related Art

There are a variety of prior art camera stabilizing devices, with the most common being a tripod. There is also a variation known as a monopod. Tripods and monopods are very well known in the art, and are commonly used by photographers to hold a camera stable while taking a photograph. There are, however, times when it is not possible or convenient to use a tripod or monopod. There are a number of places where a photographer is not allowed to use a tripod, such as in churches or other historical sites. There are also times when it is simply not convenient to carry a tripod, such as when the photographer is walking for an extended length of time. There is a need, therefore for additional options to stabilize a camera while taking certain photographs.

There are a number of prior art foot mounted stabilizing systems for cameras. U.S. Pat. No. 3,317,169, issued May 2, 1967 to Hendricks, discloses a camera tension anchor, which is a reel with a tape having a foot loop at the end, and the photographer steps into the foot loop to provide some tension on the camera to limit movement. U.S. Pat. No. 4,155,636, issued on May 22, 1979 to Reeberg discloses a strap for holding a camera steady. At one end of the strap is a thumbscrew that is used to attach the strap to the tripod mount screw on the bottom of the camera, and on the other end is a loop that can either be attached to the belt of the photographer, or when lengthened, stepped on by the photographer. U.S. Pat. No. 6,752,369, issued on Jun. 22, 2004 to Cameron, discloses a tension strap that connects to the camera tripod mount and is anchored to the ground by the photographer's foot. These types of tethers provide tension which will keep the camera from wobbling or moving excessively, but will not prevent the camera from rotating about the point of connection at the tripod mount. There is a need, therefore, for a stabilizing system that combines the stabilizing features of the foot lanyard, but incorporates a component to reduce the potential for movement about the mounting point.

SUMMARY OF THE INVENTION

The present invention incorporates a stabilization platform with a lanyard that connects to a foot strap. The lanyard provides tension to the platform which helps stabilize the camera, while the stabilization platform prevents rotational movement about the connection point. The stabilization platform is a generally triangular platform that is held in place by straps at each of the three ends of the triangle, and the straps attach to a connecting plate to create an inverse tripod which prevents excess movement of the camera. There is also a foot loop made of soft material that the photographer can wear inside his shoe so there is no need to doff and don the foot loop. There is an connecting lanyard that connects the foot loop to the connecting plate, and the connecting lanyard has at least one adjustment loop to allow easy shortening and lengthening of the connecting lanyard to accommodate photographers of different heights. The camera is mounted to the stabilization platform in two possible ways. In the first embodiment the camera is attached directly to the stabilization platform by a standard thumbscrew. In the second embodiment the stabilization platform has a mounting slot, and the camera is connected to a mounting plate by means of a thumbscrew. The mounting plate has two prongs at 90 degrees, and each prong can slide into the mounting slot, which allows the camera to be attached to the camera in the standard configuration to take landscape (horizontal) formatted photographs, or turned 90 degrees and attached in a vertical position to take portrait formatted photographs. There is also a belt clip attachment worn on the photographer's belt where the connecting lanyard can be stored when not in use.

BRIEF DESCRIPTION OF THE DRAWINGS

FIG. 1 is a side view showing the main components of the invention, which include the stabilization plate at the top, the stabilizing straps, the connecting lanyard and the bottom clip.

FIG. 2 is an overview of the invention showing the stabilization platform, the stabilizing straps, the connecting lanyard, and the foot strap on the photographer's foot inside the shoe.

FIG. 16 is a detail of the adjustment loop.

FIG. 17 is a detail of the middle clip.

FIG. 18 is a front detail of the belt station with female quick release snaps.

FIG. 19 is a side view detail of the belt station with female quick release snaps.

FIG. 23 is a top plan view of a second embodiment of the stabilization platform with the camera attachment mounting bracket.

FIG. 24 is a side view of the second embodiment of the stabilization platform with the camera attachment mounting bracket.

FIG. 25 is a rear view of the second embodiment of the stabilization platform.

FIG. 26 is a rear view of the second embodiment of the stabilization platform showing the doubled front strap.

FIG. 27 is a side view of the second embodiment of the stabilization platform showing the side stabilizing straps.

FIG. 28 is a detail of the second connecting plate.

FIG. 29 is a rear plan view of the standard camera mounting plate.

FIG. 30 is a top plan view of the standard camera mounting plate.

FIG. 31 is a rear view showing a camera attached to the standard mounting plate and the standard mounting plate in the attachment mounting bracket with the camera in the standard horizontal position FIG. 32 is a rear view showing a camera attached to the standard mounting plate and the standard mounting plate in the attachment mounting bracket with the camera in the vertical "portrait" position.

FIG. 33 is a rear plan view of the large camera mounting plate.

FIG. 34 is a rear view showing the large camera mounting plate mounted in the attachment mounting bracket to hold a camera in the standard horizontal position.

FIG. 35 is a rear view showing the large camera mounting plate mounted in the attachment mounting bracket to hold a camera in the vertical "portrait" position.

DETAILED DESCRIPTION OF THE INVENTION

Figure 3:
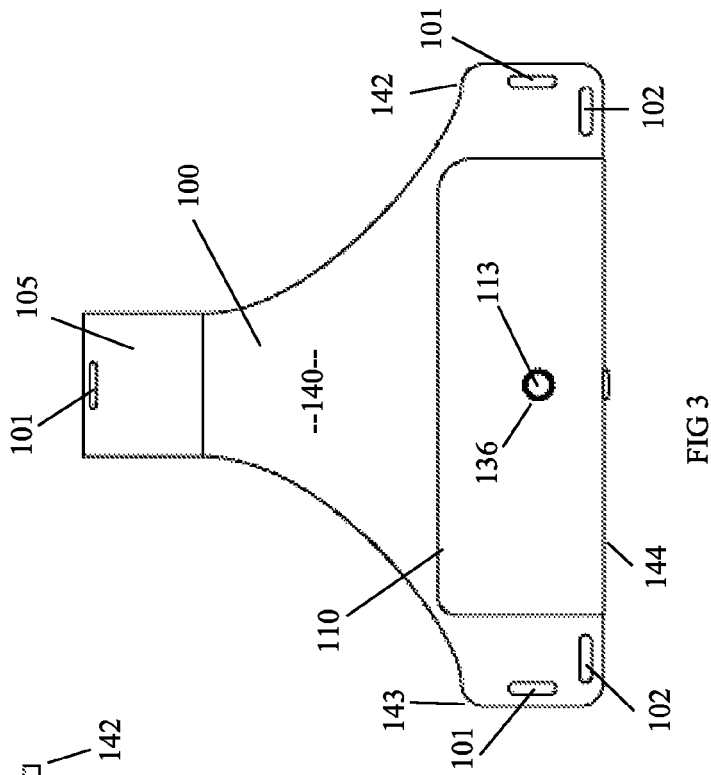
FIG. 3 is a top plan view of the stabilization platform showing the location of the thumbscrew hole and the strap slots.

Detailed embodiments of the present invention are disclosed herein. It is to be understood that the disclosed embodiments are merely exemplary of the invention, and that there may be a variety of other alternate embodiments. The figures are not necessarily to scale, and some features may be exaggerated or minimized to show details of particular components. Therefore, specified structural and functional details disclosed herein are not to be interpreted as limiting, but merely as a basis for teaching one skilled in the art to employ the varying embodiments of the present invention.

FIG. 1 & FIG. 2 show the main components of the camera stabilizing device. It depicts the camera C connected to the stabilization platform 100, and the inverted tripod 20, which consists of a number of stabilizing straps 21 & 22 which are connected to the connecting plate 30. The connecting plate 30 includes a bottom quick release snap 38 which is attached to the connecting lanyard 40 by the top quick release snap 43. The connecting lanyard 40 has at least one adjustment loop 50 to allow the photographer to adjust the overall length of the connecting lanyard 40. In one embodiment there is a middle clip 60 attached to the connecting lanyard 40. At the very bottom end of the connecting lanyard 40 there is an bottom quick release snap 47, which is connected to the foot strap 70. The foot strap 70 can be worn in the photographer's shoe during use.

Figure 5:
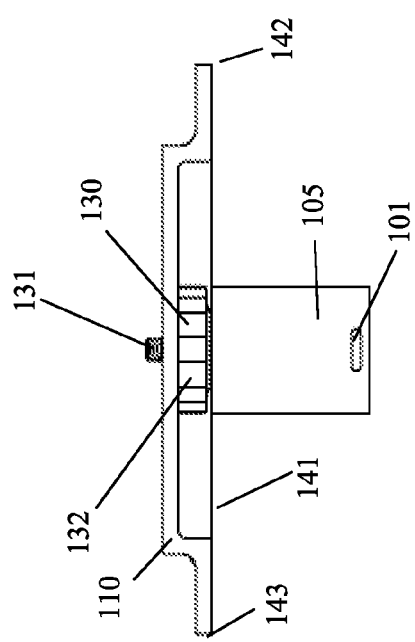
FIG. 5 is a rear plan view of the stabilization platform showing the thumbscrew and the raised camera platform.
Figure 4:
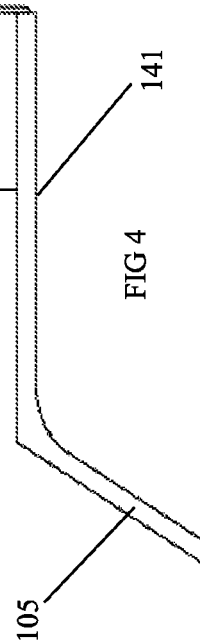
FIG. 4 is a side plan view of the stabilization platform showing the raised camera platform and the angled front arm.

FIGS. 3, 4 and 5 show the first embodiment of the stabilization platform 100. The stabilization platform 100 is essentially triangular in shape, with the tips cut off and two sides curved, when seen from above in FIG. 3. The essentially triangular shape is important for stabilizing with the inverted tripod 20 as described below. The stabilization platform 100 is made from polycarbonate molded plastic molded into shape in a specifically designed mold. The plastic of the stabilization platform 100 is approximately 3/16 of an inch thick, but the thickness can vary somewhat according to the needs of the photographer. The stabilization platform 100 has a top 140, a bottom 141, a right side 142, a left side 143, a rear side 144, and at the front a downwardly beveled front arm 105. The front arm 105 is downwardly beveled to keep it out of the field of view of the camera C so that it does not interfere with a photograph. In the preferred embodiment the stabilization platform 100 is 6.75 inches wide from left 143 to right 142, and 5.482 inches long from the rear 144 to the end of the front arm 105. In the preferred embodiment, the beveled front arm 105 extends downward 2.04 inches from the top 104 of the stabilization platform 100. The dimensions of the stabilization plate can vary slightly to accommodate cameras of differing sizes. There is a raised camera mounting platform 110 at the rear 144 of the stabilization platform 100. There is a thumbscrew hole 113 drilled into the middle of the mounting platform 110.

Figure 6:
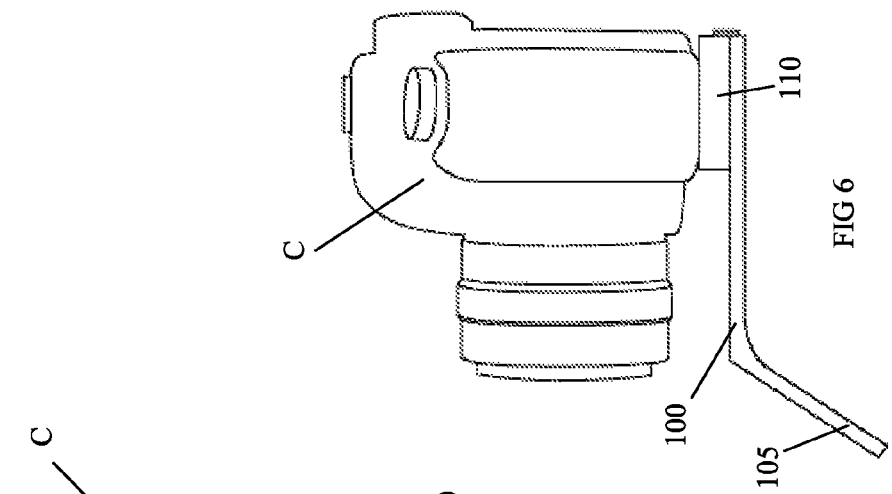
FIG. 6 is a side view of a camera attached to the stabilization platform by the thumbscrew.
Figure 7:
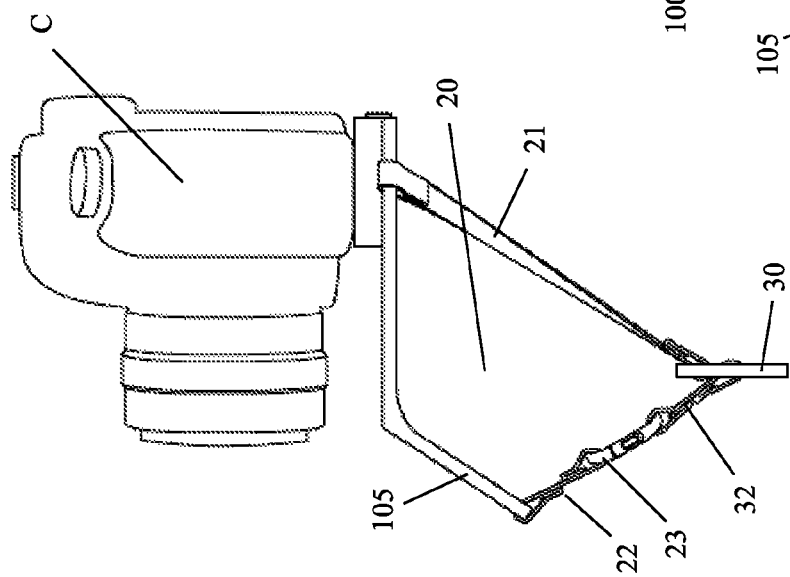
FIG. 7 is a side view of a camera attached to the stabilization platform, with the stabilizing straps in place and attached to the connecting plate to create the inverted stabilizing tripod.
Figure 8:
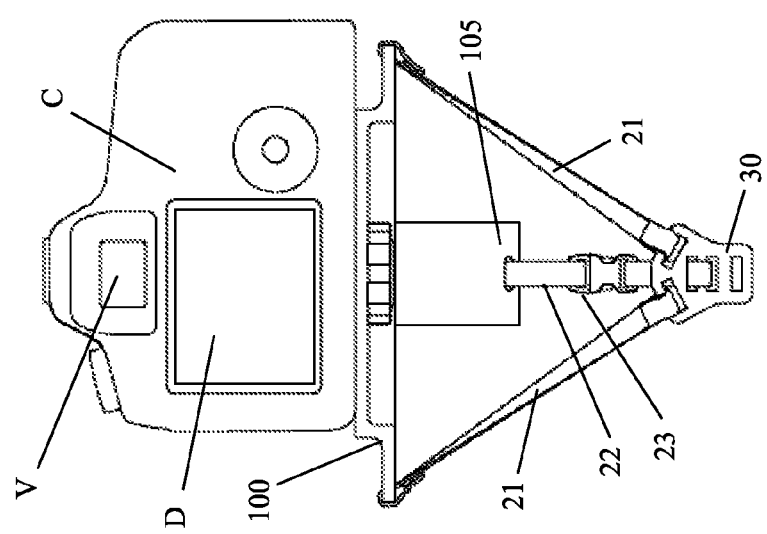
FIG. 8 is a rear view of a camera attached to the stabilization plate and showing the stabilizing straps from the two side strap slots and the third strap from the angled front arm.
Figure 9:
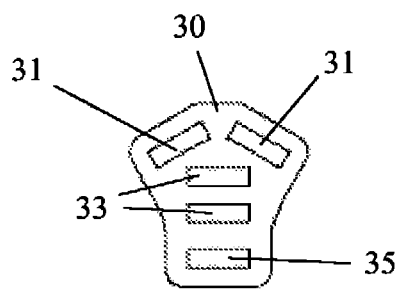
FIG. 9 is a detail of the connecting plate.

Camera mounting screws are well known in the field of photography and are a standard size so that all camera mounting equipment will fit all cameras. All cameras C have a mounting nut, commonly referred to as a tripod socket, located on the bottom of the camera and positioned to line up with the center of the lens, which is also the center of gravity, or balance point, of the camera so that all cameras can mount and be balanced on all mounting equipment such as tripods. There is a standard thumbscrew 130 that is inserted through the thumbscrew hole 113, and held in place by means of a retaining washer 136. The thumbscrew has a threaded end 131, which is the actual screw, and a thumb knob 132 which allows the user to turn the screw 130 with the thumb. The mounting platform 110 is 4.8 inches long from left to right, and 1.75 inches wide from front to back and is raised 0.5875 inch above the top 140 of the stabilization platform 100, though the specific dimensions can vary slightly. The raised mounting platform 110 allows the thumb knob 132 to be above the bottom 141 of the mounting platform 110 so that it is out of the way and does not catch on any strap or be bumped by the photographer. The mounting platform 110 also provides a space between the top 140 of the stabilization platform 100 and the camera C, which is needed to be able to mount or change a lens when the camera C is mounted, as show in FIG. 6, to the stabilization platform 100. This also allows the mounting of larger lenses, such as fish-eye lenses that have a larger profile.

Figure 10:
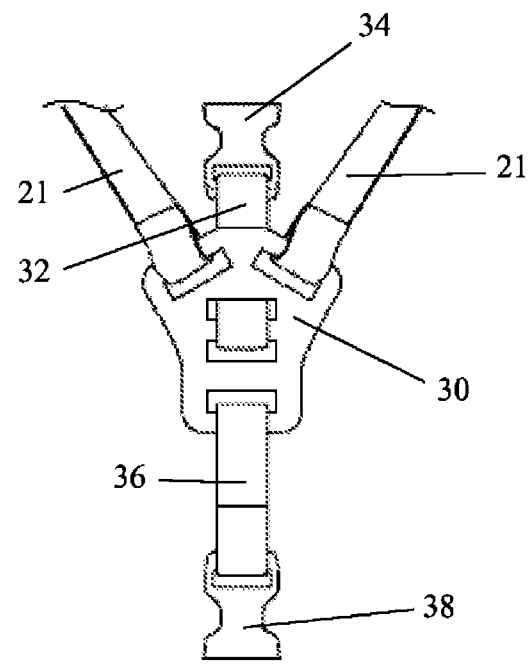
FIG. 10 is a rear view detail of the stabilizing straps attached to the connecting plate.
Figure 11:
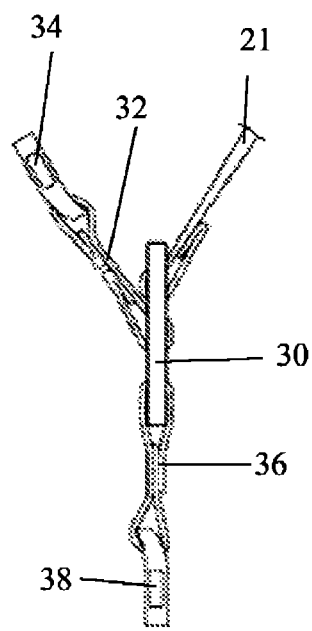
FIG. 11 is a side view detail of the stabilizing straps attached to the connecting plate.

There are two neck-strap slots 102 at the rear 144 of the stabilization platform 100. These are available should the photographer chose to attach a standard neck strap to the stabilization platform 100 to secure it around the neck. There are three strap slots 101 on the stabilization platform 100, one near the tip end of the angled front arm 105, one near the edge on the right side 142, and one near the edge on the left side 143. The slots 101 and 102 are 0.125 inches wide by 0.5 inches long, with rounded ends, and are located 0.125 inches from the respective edges of the stabilization platform 110. These dimensions can vary slightly to accommodate straps of different sizes and according to the need of the stabilization platform 100. There is a front stabilizing strap 22 and two side stabilizing straps 21 that are attached through the three strap slots 101. Details of the straps 21 and 22 and the connecting plate 30 are seen in FIGS. 7, 8, 9, 10, and 11. In the preferred embodiment the straps are 0.375 inches wide and made from standard black nylon webbing. The strap material is typically 0.071 inches thick. Such strap material is common and well known in the field of photography, and is commonly used for camera straps. The precise dimensions can vary slightly and the straps can be made from many common strap material. The straps 21 and 22 are slid and looped through the slots 101, folded against themselves and sewn into place. The front strap 22 includes a male quick release snap 23. The free end of the front strap 22 is slid through the loop of the quick release snap 23 and sewn into place. The side stabilization straps 21 are attached to a connecting plate 30. The connecting plate 30, shown in detail in FIG. 9, has a multiplicity of connecting slots, including two angled top slots 31, two middle slots 33, and a bottom slot 35. The straps 21 are attached to the connecting plate 30 by looping through the top slots 31 and sewing, as shown in FIGS. 10 & 11. It is possible, and within the conception of the invention to have Velcro hook and loop type material at the ends of the straps 21 and to removably secure the straps 21 to the stabilization platform 100 and the connecting plate 30 by means of the Velcro type attachment. There is a top connecting strap 32 which is looped through the two middle slots 33, and which has a female quick release snap 34 attached to the end. The female quick release snap 34 is paired with the male quick release snap 23 of the front strap 22 so that the front strap 22 can be removably attached to the connecting plate 30.

Figure 12:
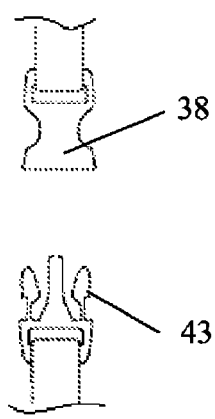
FIG. 12 is a detail of the male and female quick release snaps.
Figure 13:
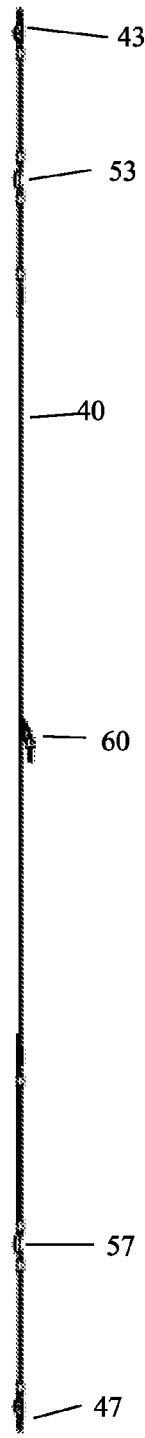
FIG. 13 is a side view of the connecting lanyard showing the top attachment clip, the top adjustment loop, the belt clip, the bottom adjustment loop and the bottom attachment clip.
Figure 14:
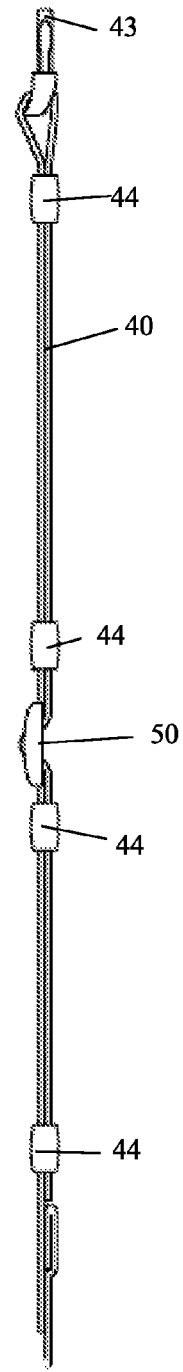
FIG. 14 is a side view detail of an attachment clip and an adjustment loop of the connecting lanyard.
Figure 15:
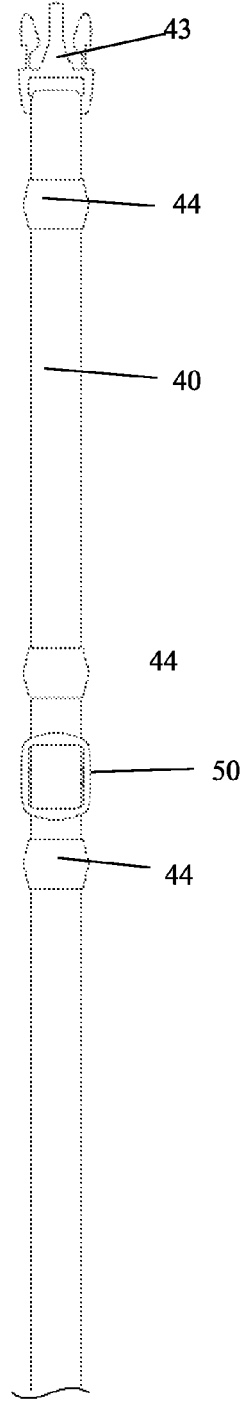
FIG. 15 is a front view detail of an attachment clip and an adjustment loop of the connecting lanyard.

The male and female quick release snaps described herein, and shown in FIG. 12, are common, well known, and standard size in the field of photography. FIG. 12 shows a pair of representative quick release snaps, with the male end 43 and the female end 38. These quick release snaps are attached to the ends of the related strap material by sliding the strap through the loop and in some cases sewing the strap material to itself, as is well known. The male end 43 has two prongs with tabs, and the female end 38 has a recess with slots, where the tabs fit into the slots and snap into place. The quick release snaps can be detached by simply pinching the two tabs which pushes them out of the slots and allows the snaps to be pulled apart.

When the front stabilizing strap 22 and two side stabilizing straps 21 are attached to the stabilization platform 100 and the connecting plate 30 an equilateral inverted pyramid 20 is formed. This is essentially an inverted tripod that will help prevent movement of the stabilization platform 100.

There is a bottom strap 36 attached to the bottom slot 35 of the connecting plate 30. The bottom strap 36 has a female quick release snap 38 attached. The female quick release snap 38 is removably attachable the top male quick release snap 43 of the connecting lanyard 40. Details of the lanyard are shown in FIGS. 13, 14, 15, 16 and 17. The connecting lanyard 40 is a length of 0.375 nylon mesh strap material described above. There is a middle loop 60 located approximately in the middle of the connecting lanyard 40. The middle loop 60 is a loop of strap material connected to a male quick release snap 61. The length of the strap material used for the connecting lanyard 40 will vary depending on the height of the anticipated photographer, but the length of the connecting lanyard 40 can be adjusted by means of at least one adjustment loop 50. In the preferred embodiment there is a top adjustment loop 53 and a bottom adjustment loop 57, but both loops have the same adjustment configuration and operation. In one embodiment there will be an adjustment loop triglide 50, shown in FIG. 9, at both the top and the bottom of the connecting lanyard 40. Such adjustment triglide loops 50 are well known for adjusting the length of straps in a variety of fields, including photography. Essentially the connecting lanyard 40 is run through the two openings 51 of the adjustment loop 50, run through at least one, and possibly two grommets 44, then run through the top attachment 43 or the bottom attachment 47, then on the return run again through the grommets, and then the strap is again run through the openings 51 of the adjustment loop 50. In some embodiments there is an additional grommet 44 to hold the excess strap material. To shorten the connecting lanyard 40 the unattached end of the strap is pulled toward the middle of the lanyard 40. Lengthening the connecting lanyard 40 is done in the same manner as adjusting the length of common straps. The grommets 44 are sized to fit tightly over the doubled straps of the connecting lanyard 40 and hold the straps in place. This allows the photographer to adjust the length of the connecting lanyard 40 without worrying about excess material from the strap hanging free.

Figure 20:
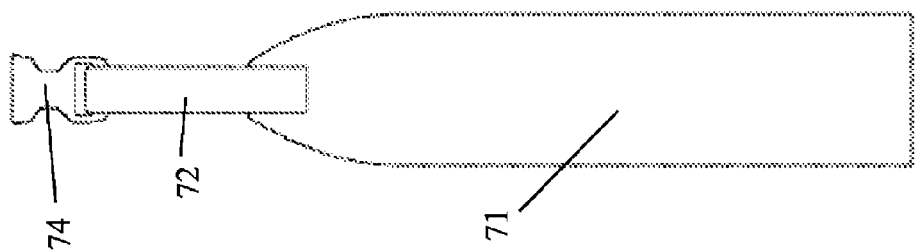
FIG. 20 is a front view of the foot strap.
Figure 21:
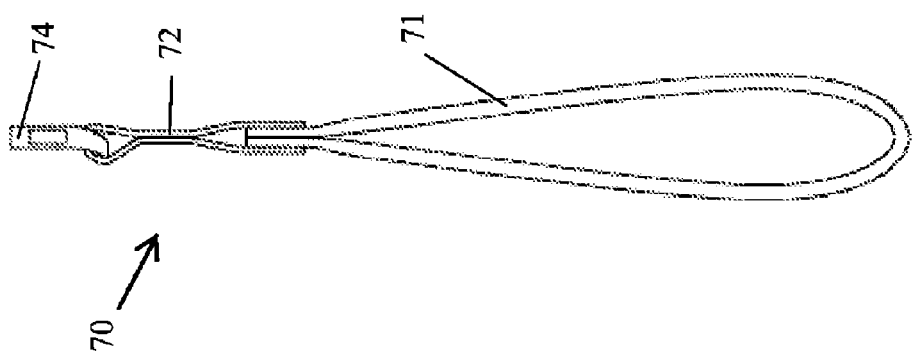
FIG. 21 is a side view of the foot strap.
Figure 22:
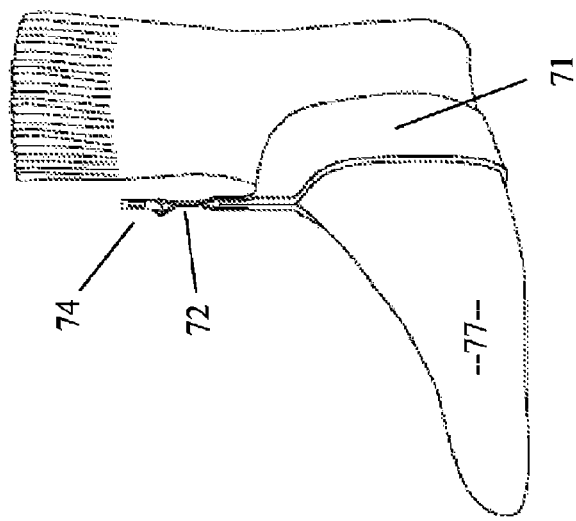
FIG. 22 is a perspective view of the foot strap positioned on a foot.

At the bottom of the connecting lanyard 40 there is a bottom male quick release snap 47. The male quick release snap 47 attaches the connecting lanyard 40 to the components of the foot strap 70. The foot strap 70 and its components are shown in FIGS. 20, 21 & 22. The foot strap 70 consists of a foot loop 71, which is a length of soft semi-stretchy material that is attached at the top by the retainer 72. In the preferred embodiment the foot loop 71 is made from a piece of 11.5 inch by 1.25 inch length of neoprene material with slightly beveled ends which are sewn together, but other similar materials can be used, and the size can vary slightly according to the needs of the photographer. In one embodiment the foot loop 71 is sewn together to create a flat loop as shown in FIG. 21. The retainer 72 is a piece of strap material sewn to the foot loop 71. There is a female quick release snap 74 connected at the top of the retainer 72, which is position to attach to the bottom male quick release snap 47 of the connecting lanyard 40. As shown in FIG. 22, the foot loop 71 can be placed around the photographer's foot, and then the shoe simply slipped into a shoe to hold the foot loop 71 and foot strap 70 securely in place. The foot with the foot loop 71 around it is known as the base foot 77. The soft material of the foot loop 71 allows the photographer to comfortably wear the foot strap 70 for an extended period of time, and so does not have to repeatedly take on and off the foot strap 70, as is common in some of the prior art.

In use, as shown in FIG. 2, the photographer will slip the foot loop 71 around his or her foot then place the foot inside the shoe. The camera C can be mounted to the stabilization platform 100 by means of the thumbscrew 130 on the camera platform 110. The straps 21 and 22 will be pre-attached to the stabilization platform 100, and connected to the connecting plate 30. The photographer can then attach the connecting plate 30 to the connecting lanyard 40 by means of the female quick release snap 38 attached to the lanyard top male quick release snap 43. The connecting lanyard 40 can then be attached to the foot strap 70 by means of the bottom male quick release snap 47 and paired female quick release snap 74. The overall height of the stabilization platform 100 can be adjusted by means of the top adjustment loop 53 and the bottom adjustment loop 57 in the manner described above. Typically a photographer wants to be able to look thought the view finder V of the camera C, when standing fully and comfortably upright. Modern digital cameras C frequently have a digital display D, and in some cases the photographer might want to be able to look at the display D rather than through the view finder V. The adjustability of the connecting lanyard 40 by means of the adjustment loops 50 allows the photographer to easily adjust the disclosed camera stabilizing device to the desired length.

If the photographer will be using the camera C and stabilizing device out of the studio, for example when taking pictures around a city, he or she can temporarily attach the connecting lanyard 40 to the belt station 62, shown in FIGS. 18 & 19. The belt station 62 is used to store the connecting lanyard 40 until needed. The belt station 62 is made from a single 9 inch length of five-eighths (0.625) inch nylon-mesh strap. The strap loops around the user's belt and is secured by half inch length of Velcro 64 sewn onto each end. Three three-eighths (0.375) inch wide straps with female quick release snaps 63 attached, are sewn on to the main strap. Depending on the situation, the photographer may choose to attach any of the male quick release snaps 43, 61, or 47 to the female quick release snaps 63 of the belt station 62. This allows the photographer to carry the connecting lanyard 40 in a convenient manner. Then, when the photographer is ready to take a picture, he or she can disconnect the connecting lanyard 40 from the belt station 62, and then connect the stabilization platform 100 to the connecting lanyard 40 as described above and use the stabilizing device to stabilize the camera C for a clear photograph.

When in use, and inverse tripod 20 is created by the stabilizing straps 21 and 22 when they are connected to the connecting plate 30. The connecting plate 30 is attached to the connecting lanyard 40, which is connected to the foot strap 70. The photographer pulls up the camera C to the desired height, which will raise the stabilization platform 100 and create tension. The stabilization platform 100 is small enough and light enough that it will not significantly add to the weight of the camera C. When properly sized, there will be a slight amount of tension created on the connecting lanyard 40, which will pull down slightly on the connecting plate 30, which will pull down slightly on the three stabilizing straps 21 and 22, which will provide tension to the three sides of the stabilization platform 100 which will help to minimize movement on the three sides of the stabilization platform 100, which will help stabilize the camera C while taking a photograph. The tension in the connecting lanyard 40 will prevent a great deal of movement of the camera C, and the stabilization platform 100 will prevent most rotational movement of the camera C. To take a level photograph, the base foot 77 is placed directly under the stabilization platform 100. This provides proper tension to stabilize the camera C. For a photograph with the lens tilted down, the photographer must lean forward. Depending on the angle, the non-base foot may need to be moved forward. To tilt the lens up, the photographer leans back. The non-base foot may need to be is moved back. For more extreme angles down, the two side stabilizing straps 21 are keep taut are while pointing the camera down as the front strap 22 slackens. For more extreme angles up, the front strap 22 is detached from the connecting plate 30. When the front strap 22 is not attached the stabilizing system still has two-point stability about the two side stabilizing straps 21, and the photographer can angle the camera up or down.

There is a second embodiment of the stabilizing device that uses a modified stabilization platform 200, shown in FIGS. 23 to 35. In this second embodiment, the camera C does not attach directly to the modified stabilization platform 200, but rather is mounted to a mounting plate. There are two variations of mounting plate, a standard sized mounting plate 80 and a large mounting plate 90, for use with larger cameras C, or a camera with attached battery grip, and both mount to the same components on the second embodiment of the stabilization platform 200, depicted in FIGS. 23, 24 & 25. In the second embodiment the stabilization platform 200 is three sided, with a beveled front section 205, a right side 242, a left side 243 and a back 244. The beveled front section 205 extends forward and downward from the flat top 240 of the stabilization platform 200. The stabilization platform 200 also has a top 240 and a bottom 241. The overall dimensions of the second embodiment of the stabilization platform 200 is the same as the dimensions of the first embodiment of the stabilization platform 100. There is a mounting bracket 210 on the top 240 at the back 244 of the stabilization platform 200. In the preferred embodiment the mounting bracket 201 is 2.0625 inches wide from left to right, and 1.7185 inches from front to back, but these dimensions can vary to accommodate mounting plates of different dimensions. There is flat gap between the mounting bracket 210 and the top 240 which creates a mounting slot 211 in space therein. The mounting slot 311 is 0.1875 inches wide, but this dimension can vary as noted above. There is a mounting ridge 212 that runs back to front and parallel to the edge of the mounting bracket 210. In the preferred embodiment the mounting ridge is 1.5 inches long, 0.7875 inch high and three-sixteenth of an inch (0.1875") thick. There is a gap 213 between the edge of the mounting bracket 210 and the mounting ridge 212. The gap 213 is approximately three-sixteenth of an inch wide. The mounting bracket 210, mounting ridge 212 and gap 213 are sized to fit either the standard size mounting plate 80 or the large size mounting plate 90 as described below.

The second embodiment of the stabilization platform 200 also includes a modified inverted pyramid stabilizing strap system 220, which works in conjunction with the modified strap slots 201 of the stabilization platform 200. There are two strap slots 201 located near the front of the beveled front section 205, a strap slot 201 on the right side 242, and a strap slot 201 on the left side 243. There are also two neck strap slots 202 on the back 244 one each near the right side 242 and left side 243. The two neck strap slots 202 are positioned for attaching a standard camera neck strap (not shown). In this embodiment of the inverted pyramid stabilizing system 220 there are two stabilizing straps 21, as shown in FIGS. 26 & 27. There is also a modified connecting plate 230, shown in FIG. 28, which has two beveled top slots having spindles 231, or rollers, and a single bottom slot 232. One stabilizing strap 21 is attached to the strap slot on the right side 242 (by looping through and sewing, as described above) run through one of the slots 233 below the beveled top spindle 231 and attached to the right most of the strap slots 201 on the beveled front section 205. The second stabilizing strap 21 is attached to the strap slot on the left side 243 run through the open slot 233 below the beveled top spindle 231 and attached to the left most of the strap slots 201 on the beveled front section 205. The use of the two stabilizing straps 21 running through the single connecting plate 230 and attaching side by side at the beveled front section 250 creates the inverted pyramid stabilizing system 220. The spindles 231 allow the stabilization platform 200 to rotate forward to backward with the stabilizing straps 21 rolling on the spindles 231. The bottom clip 38, as described above, is attached through the single bottom slot 232, and this clip is attachable to the connecting lanyard 40 as described above. All of the components below the bottom clip 38 as described above, are the same in the second embodiment as in the first embodiment.

The small mounting plate 80 is shown in FIGS. 29 & 30, and shown in FIGS. 31 & 32 with a camera C attached, and the mounting plate 80 attached to the mounting bracket 210 on the stabilization platform 200. The small mounting plate 80 is 5.6188 inches long and one and one half inches (1.5") wide. There is a thumb screw hole 213, with a thumb screw 130 mounted therein as described above. The thumbscrew hole 213 is offset from the middle of the mounting plate 80, at 2.25 inches from the right edge, and 0.6188 inches from the back. The thumbscrew hole is aligned so that when the mounting plate 80 is attached to the mounting bracket 210 (as described below) the thumbscrew 130 will be in the center of balance of the stabilization platform 200, and the center of the lens will align with the center of the stabilization platform 200. Depending on the camera, there might be a slight variation to the central alignment. Larger professional cameras and consumer DSLR's with battery grips should be mounted using the larger mounting plate 90, as described below. The body of the mounting plate 80 is a flat piece of molded plastic, and is 3/16" thick. From the rear, as seen in FIG. 29, there is a downwardly protruding bottom heel 82b. The bottom heel 82b is extended downward at a 90 degree angle from the flat body of the mounting plate, and extends one inch down from the top of the mounting plate 80. There is an bottom attaching slat 81b attached to the underside of the mounting plate 80. The bottom attaching slat 81b extends downward at ninety degrees for 13/16 of an inch from the bottom of the mounting plate 80, and then makes a right angle and runs parallel to the mounting plate 80. The overall length of the attaching slat 81b is 2.06875 inches. The space between the bottom heel 82b and the side of the bottom attaching slat 81b is the bottom crook 83b. The bottom crook 83b is 3/16 of an inch wide, 13/16 of an inch deep and runs the full width of the mounting plate 80. The actual dimensions of the slat 81b, heel 82b and crook 83b can vary slightly depending upon the thickness of the material used for the mounting plates 80 & 90, and the stabilization platform 200. At the far left edge of the mounting plate 80 there is a side attaching slat 81s that extends upward at ninety degrees from the body of the mounting plate 80. There is a side heel 82s that extends downward from the body of the mounting plate 80, and which runs parallel to the body of the mounting plate 80. There is a side crook 83s between the side heel 82s and the side slat 81s. The size and geometry of the bottom and side slat 81b and 81s, the bottom and side heel 82b and 82s and the bottom and side crook 83b and 83s are identical, and are sized to fit securely within the mounting bracket 210. When either attaching slat 81b or 81s is slid into the mounting slot 211 the mounting ridge 212 will fit securely within the crook 83b or 83s, and the edge of the slat will fit within the gap 213. This will hold the mounting plate 80 securely onto the stabilization platform 200. When the camera C is attached to the mounting plate 80, as shown in FIGS. 31 and 32, the camera C can be attached to the stabilization platform 200 in two different positions. FIG. 31 shows the camera C mounted to the stabilization platform in the standard horizontal orientation by means of the bottom slat 81 b. When the camera C is mounted in this position, the thumb screw 130 positions the camera C so that the lens of the camera is in the center of the stabilization platform 200. FIG. 32 shows the camera C mounted to the mounting plate 80, and the mounting plate 80 attached to the mounting bracket 210 by the side attachment slat 81s. When mounted with the side attachment slat 81s the camera C will be mounted to the stabilization platform in the vertical position, which is often referred to as the portrait position because this is the common position for taking portraits.

The large mounting plate 90 is shown in FIG. 33, and shown attached to the stabilization platform in FIGS. 34 and 35. The large mounting plate 90 is approximately six and one half inches long, and includes an extending side arm 95 and an extending elbow 96 which allows the large mounting plate 90 to accommodate larger cameras or standard cameras equipped with ancillary equipment such as a battery pack. The large mounting plate 90 is designed for larger cameras C, or for cameras C with battery packs attached, which can change the size of the camera. The addition of the side arm 95 and extending elbow 96 allows the camera to offset properly when attached to the mounting plate 90 and when the mounting plate 90 is mounted on the stabilization platform 200. The large mounting plate is 6.7 inches long from left to right, the side arm 95 is 1.5786 inches long, and the extending elbow is one inch long. The size and geometry of the attaching components of the large mounting plate 90 are the same as the standard mounting plate 80. From the rear, as seen in FIG. 33, there is a downwardly protruding bottom heel 92b. The bottom heel 92b is extended downward at a 90 degree angle from the flat body of the mounting plate 90. There is a bottom attaching slat 91b attached to the underside of the mounting plate 90. The bottom attaching slat 91b extends downward at ninety degrees, and then makes a right angle and runs parallel to the mounting plate 90. The space between the bottom heel 92b and the side of the bottom attaching slat 91b is the bottom crook 93b. At the far left edge of the mounting plate 90 there is an extending side arm 95 that extends upward at ninety degrees, and attached thereto at ninety degrees is an extending elbow 96. There is a side attaching slat 91s that extends upward at ninety degrees from the extending elbow 96. There is a side heel 92s that extends sideward from the extending arm 95 and which runs parallel to extending elbow 96. There is a side crook 93s between the side heel 92s and the extending elbow 96. The size and geometry of the bottom and side slat 91b and 91s, the bottom and side heel 92b and 92s and the bottom and side crook 93b and 93s are identical, and are sized to fit securely within the mounting bracket 210. The size and geometry of the slats 91b & 91s are identical to 81b & 81s, the size and geometry of the heel 92b & 92s are identical to 82b & 82s, and the size and geometry of the crooks 93b & 93s are identical to 83b & 83s, as set out above. When either attaching slat 91b or 91s is slid into the mounting slot 211 the mounting ridge 212 will fit securely within the crook 93b or 93s, and the edge of the slat will fit within the gap 213. When the bottom slat 91b is mounted in the mounting slat 211 the camera C will be held in the standard horizontal position, and when the side slat 91s is mounted in the mounting slat 211 the camera C will be held in the vertical position.

The use of the second embodiment of the stabilization platform 200 is essentially the same as for the first embodiment. The foot strap 70 is attached to the foot of the photographer, the connecting lanyard 40 is attached to the foot strap 70 as described above, and the stabilization platform is attached to the connecting lanyard 40 by the bottom clip 36. The photographer can adjust the position of the stabilization platform 200 as described above so that they can view their desired subject of photography through either the view finder V or the digital display D. The photographer lifts up slightly on the stabilization platform 200 to create tension through the connecting lanyard 200, which will help stabilize the camera C. The benefit of this second embodiment is that the photographer can aim the camera up or down by rotating the stabilization platform 200 forward or backward. The stabilizing straps 21 will roll across the spindles 231 to allow easy movement of the camera C. This is an improvement over first embodiment of the stabilization platform 100, which necessitates that the photographer shift his or her position and lean either forward or back to adjust the tilt of the camera C.

The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are exemplary only, and are not exhaustive of the scope of the invention. Consequently, the present invention is intended to be limited only be the spirit and scope of the claims, giving full cognizance to equivalents in all respects.

I claim:

1. A camera stabilizing device comprising;
a stabilization platform having camera attachment means and a multiplicity of slots:
a multiplicity of stabilizing straps attached to said multiplicity of slots on said stabilizing platform, said stabilizing straps connecting to a connecting plate to create an inverse pyramid tripod to minimize the movement of the stabilizing platform, said connecting plate further having a clip;
a connecting lanyard removably attached to the clip of said connecting plate; and
a foot attachment means removably attached to the connecting lanyard;
wherein when a user attaches a camera to the stabilization platform and place the foot attachment means around a foot, said foot attachment means secures the bottom of the connecting lanyard, and when the user raises the camera to take a photograph tension is created on the connecting lanyard which creates tension on the connecting plate and the multiplicity of stabilizing straps to stabilize the stabilization platform and the camera.

2. The camera stabilizing device of claim 1 wherein the stabilization platform is roughly triangular in shape with the camera attachment means at the base of the triangle and wherein the front of the triangular platform is beveled downward such that it is not in the field of view of the camera, and wherein there are three attachment slots near the three corners of the triangular stabilization platform.

3. The camera stabilizing device of claim 2 wherein there are three stabilizing straps that are attached to the attachment slots and connect to the connecting plate below the stabilization platform to create an inverted equilateral pyramid which creates an inverse tripod to limit movement of the stabilization platform.

4. The camera stabilizing device of claim 2 wherein the camera attachment means comprises a thumbscrew hole with a standard camera thumbscrew retained in place by means of a washer such that a camera can be attached to the stabilization platform.

5. The camera stabilizing device of claim 4 further including a mounting platform attached to said stabilization platform, wherein said thumbscrew hole is in said mounting platform, and said mounting platform is offset from said stabilization platform to allow a photographer to attach a lens to a camera when said camera is attached to said mounting platform by said thumbscrew.

6. The camera stabilizing device of claim 1 wherein the camera attachment means consists of a mounting bracket attached to said stabilization platform, and further comprising a mounting plate attachable to a camera by a thumbscrew wherein said mounting plate is configured to removably attach to said mounting bracket.

7. The camera stabilizing device of claim 6 wherein said mounting plate has bottom mounting components and side mounting components, said bottom mounting components and side mounting components configured to removably attach to said mounting bracket wherein when a camera is attached to said mounting plate and said mounting plate is removably attached to said mounting bracket by means of said bottom mounting components said camera is attached to said stabilization platform in a horizontal position, and wherein when said mounting plate is removably attached to said mounting bracket by means of said side mounting components, said camera is attached to said stabilization platform in a vertical position.

8. The camera stabilizing device of claim 7 wherein said mounting bracket can come in different sizes to accommodate cameras of different sizes.

9. The camera stabilizing device of claim 6 wherein said stabilization platform is essentially triangular with a downwardly extending front side, and wherein there are four slots, one on a right side, one on a left side, and two on said downwardly extending front side, and wherein further said connecting plate includes two rollers, and wherein there are two stabilizing straps, one which runs from the slot on the right side, through said one of said rollers and to one of the slots on the front side and wherein the other strap runs from the slot on the left side, through the other of said rollers and to the other slot on the front side to allow the stabilization platform to roll on the connecting plate.

10. The camera stabilizing device of claim 1 wherein the connecting lanyard includes adjustment means to alter the length of the connecting lanyard to accommodate users of different heights.

11. The camera stabilizing device of claim 10 wherein the adjustment means includes a sliding loop and retaining grommets to allow the length of the connecting lanyard to be altered.

12. The camera stabilizing device of claim 1 wherein said foot attachment means includes a foot strap that can be secured around the foot of the user.

13. The camera stabilizing device of claim 12 wherein said foot strap is made of a soft and pliable material such that it can be worn in a shoe of a user.

14. The camera stabilizing device of claim 1 further comprising a belt attachment with a multiplicity of clips, and wherein said connecting lanyard further includes a top clip to removably attach said connecting lanyard to said connecting plate, a middle clip, and a bottom clip to removably attach said connecting lanyard to said foot attachment, and wherein further the top clip, middle clip, and bottom clip can attach to the multiplicity of clips on said belt attachment to allow a user to carry the connecting lanyard when not in use.

* * * * *